July 19, 1955  E. GARABEDIAN  2,713,184
MOLDING APPARATUS

Filed Jan. 15, 1953  2 Sheets-Sheet 1

INVENTOR.
Edward Garabedian
BY
Barlow & Barlow
ATTORNEY

July 19, 1955 E. GARABEDIAN 2,713,184
MOLDING APPARATUS
Filed Jan. 15, 1953 2 Sheets-Sheet 2
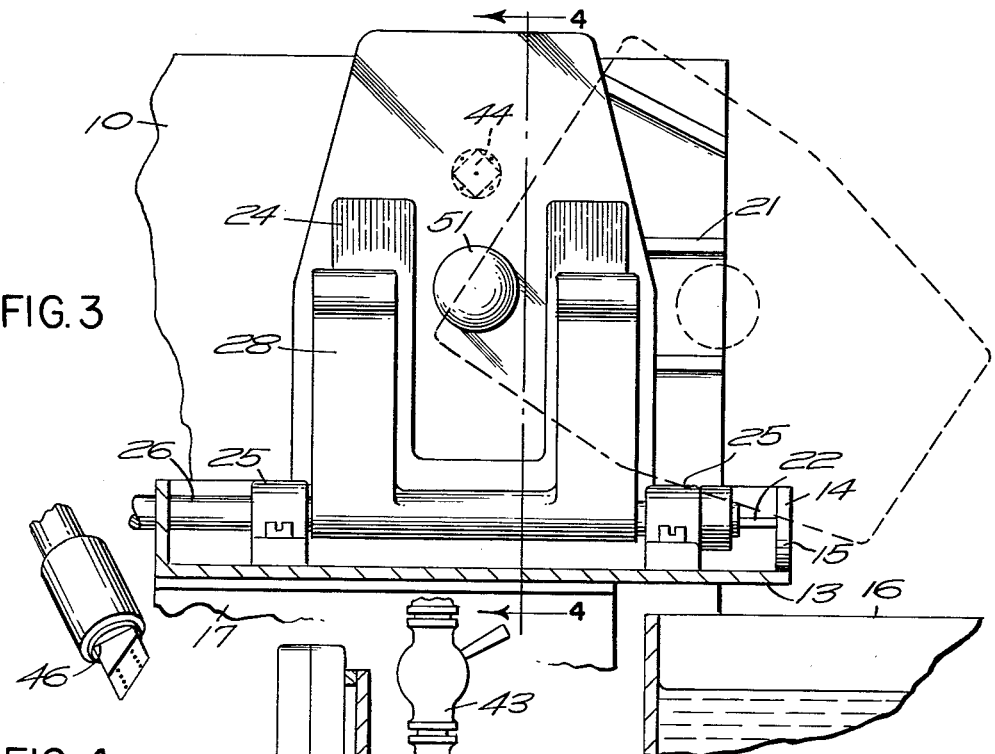
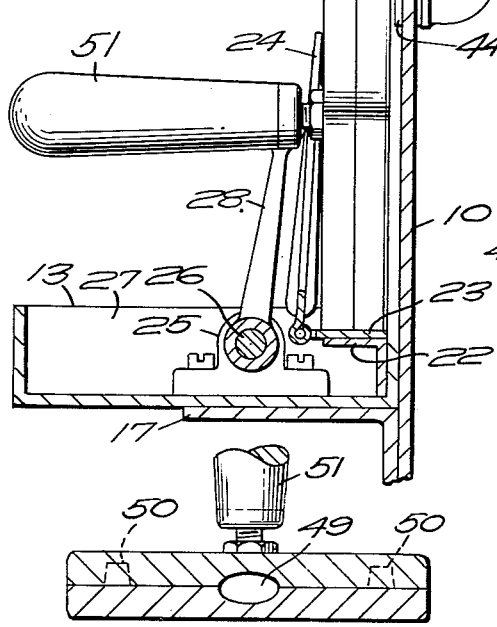
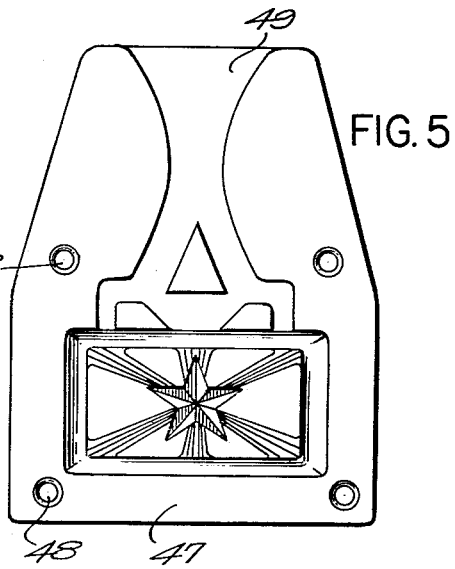
INVENTOR.
Edward Garabedian
BY
Barlow & Barlow
ATTORNEY

United States Patent Office 2,713,184
Patented July 19, 1955

2,713,184

MOLDING APPARATUS

Edward Garabedian, East Providence, R. I.

Application January 15, 1953, Serial No. 331,353

6 Claims. (Cl. 22—156)

My present invention relates to a so called chill mold and more particularly to a novel type of apparatus to facilitate the molding with such molds.

The principal object of the present invention is to provide a device for molding with chill molds which will eliminate all risks of burns to the operator.

Another object of the present invention is to provide a device which will eliminate the tedious manual labor of supporting, lifting and tipping the mold.

A further object of the present invention is to provide a device which will eliminate the risk of dropping the mold during the molding operation.

Another object of the present invention is to provide a device which will eliminate the necessity of dipping the mold for chilling.

A further object of the present invention is to provide a device which will greatly increase the speed of the operation.

With the above and other objects and advantageous features in view, my invention consists of a novel arrangement of parts, more fully disclosed in the detailed description following, in conjunction with the accompanying drawings, and more particularly defined in the appended claims.

In the drawings:

Fig. 3 is a front view of the clamping mechanism with a mold in place.

Fig. 4 is a section taken on line 4—4 on Fig. 3 with the mold shown in full lines.

Fig. 5 is a plan view of the mold cavity member.

Fig. 6 is a horizontal section through the mold.

Figure 1:
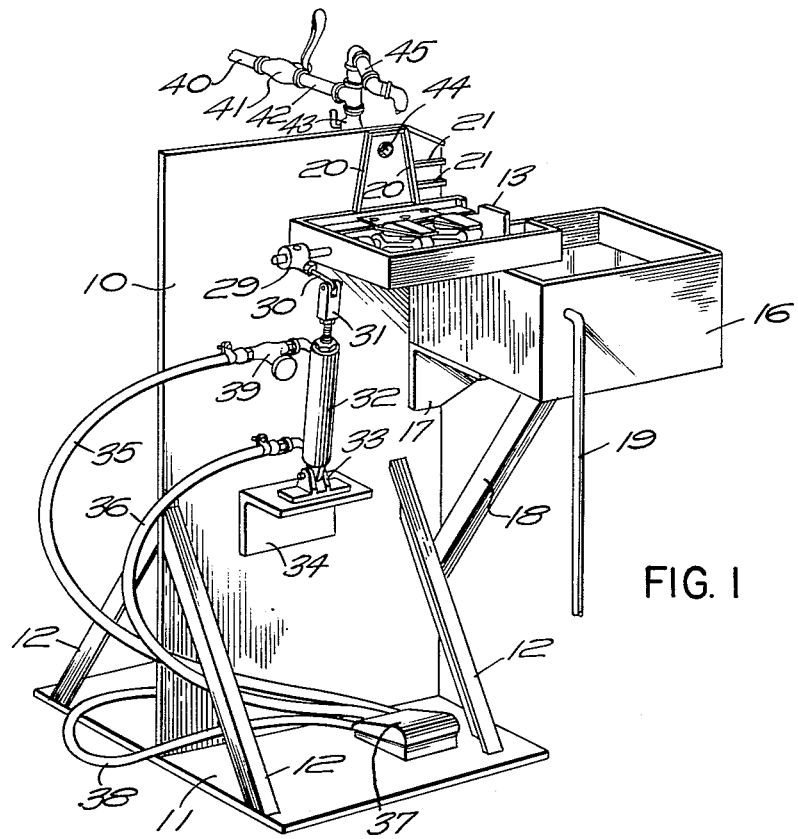
Fig. 1 is a perspective view of the apparatus embodying my invention.

In the molding of such items as belt buckles, ornaments for ladies' handbags and hats, and some items of costume jewelry, it is customary to use a cheap metal alloy in a so called "chill mold." The chill mold comes in two sections with a mold cavity between and an opening formed at the top for pouring hot metal into the cavity. One of the mold sections is provided with a short wooden handle extending laterally. The procedure is as follows:

A pair of pointed pliers are constantly held in the right hand of the operator. The handle of the mold is held in the left hand and the mold is pressed against an angle iron bracket attached to a work bench. The degree of pressure required varies with the size of the mold for the perfection of the joints. If insufficient pressure is applied the molten metal will leak and ruin the piece.

Still grasping the pliers, the operator reaches into the melting pot with a ladle, estimates the quantity required, and pours the molten metal into the throat of the mold while maintaining the pressure on the mold with his left hand and his body. The ladle is now laid down and the pressure released. The back half of the mold should now be stuck to the front half. The operator lifts the mold with his left hand and holds back part of the mold with end of the pliers. He lifts it above the top of the angle iron, carries it over to a pan and twists the mold upside down to pour out the excess metal in the throat of the mold. This is necessary to leave a hollow core in the throat of the mold into which the pliers can be inserted. The mold, still being held together with the handle and the pliers is swung to the operator's left toward the basin of water and in an upside down position is quickly dipped into the water to chill the mold. This is necessary as an aid to releasing the mold piece. However, the water soon gets very hot and as the mold is dipped in a steaming sizzle of steam and hot water flashes upwardly and often severely burns the operator.

After dipping, the operator brings the two mold halves still supported by the pliers back to the work bench and separates the mold by inserting the pliers into the hollow core and loosening the two halves of the mold. During these operations fatigue and burns sometimes cause involuntary slipping or dropping of a mold half into a basin of water and chilling it to such a degree as to make its further use impossible until it is again reheated. The spillage of the metal from the throat of the mold must also be occasionally removed from the pan causing stoppage of the operation. If during the operation the half of the mold held in the operator's hand receives more chilling than the other half it is likely that the product will remain stuck to the back half. This requires the turning of the back half of the molder over on its back and grasping the top of the product with pliers and breaking it loose from the mold causing additional delay in the operation.

The apparatus of the present invention is designed to eliminate the holding and pressure, lifting and carrying operations of the mold, thus eliminating the fatigue, eliminating burns and greatly increasing the speed of the operation. The present invention also eliminates the guess work of chilling and takes care of the spillage of excess metal. In the apparatus of the present invention the mold requires the use of the operator for the purpose of holding and guiding, but not for pressure. The danger of burns is eliminated.

Figure 2:
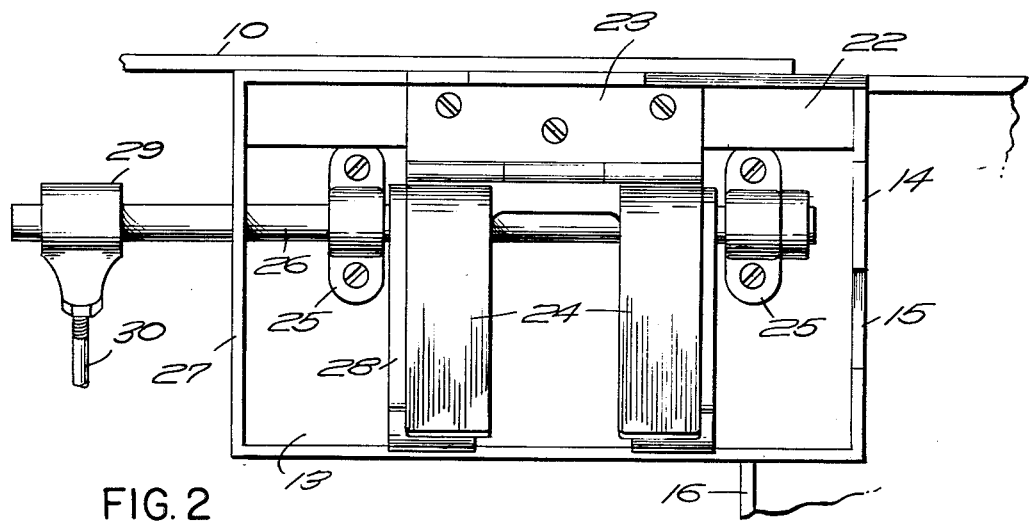
Fig. 2 is a plan view of the clamping mechanism.

Referring to Figs. 1 and 2, the apparatus of the present invention is preferably mounted on a vertical plate 10 which is held in position on a base 11 by the angle irons 12 or in any other desired manner. Mounted on the plate 10 adjacent the upper right hand edge thereof is a tray 13 having shallow sides, the right hand side edge 14 having a cut out portion 15. Mounted beneath the tray 13 and extending outwardly from the right side edge of it is the tank 16 supported by a bracket 17 and angle iron 18. The opening 15 in the tray wall 14 extends over the tank as shown in Figs. 1 and 2. The tank 16 may be provided with an overflow pipe 19 leading to a waste drain (not shown).

The face of the plate 10 immediately above the tray 13 will be provided with supporting rails 20 generally rectangular in shape and a pair of spaced supporting rails 21 extending towards the edge for supporting the mold in spaced relation to the plate 10 during the operation. The inner wall of the tray 13 is provided with an angle iron 22 to which a hinge member 23 is attached. Hinged to the member 23 are a pair of pressure strips 24 designed to bear against the handle portion of the mold as shown in Figs. 3 and 4. A pair of spaced bearing members 25 are fastened to the bottom of the tray 13 and the operating rod 26 is supported in the bearing 25 and extends outwardly from the tray through the wall 27. A U-shaped pressure member 28, see Fig. 3, is mounted on the rod 26 by the bearings 25. Turning movement of the rod 26 will cause the pressure member 28 to push the pressure strips 24 into the position shown in Fig. 4.

The rod is operated from its outer end, to the left in Figs. 1 and 2 by means of a collar 29 and rod 30 attached to the upper end of a piston 31 in a pressure cylinder 32. The cylinder 32 is pivotally mounted as at 33 on an angle iron platform 34 which is also mounted on the plate 10. The cylinder 32 is fluid operated by means of a lower pressure line 36 leading to a reversing foot pedal switch 37 to which a power line 38 also leads. The power line 38 leads to a source of air or hydraulic pressure (not shown). The upper line 35 is provided with a slow acting valve 39 by the cylinder 32 and prevents rapid motion of piston 31.

The cooling liquid used is cold water. The pipe 40 coming from the water supply is controlled by hand operated valve 41. The pipe 42 extending from the valve 41 splits into two branches. One branch 43 leads to a nozzle 44 in the upper portion of the rectangle formed by the rails 20 in the plate 10. The nozzle 44 is preferably provided with a plurality of fine openings to produce a fine spray. The upper branch 45 terminates in a nozzle 46 which is aimed towards the upper front portion of the mold and is also designed to produce a fine spray. Either or both nozzles may be of the conventional air type so that air could be mixed with the water spray if desired.

In operation the rear mold cavity 47 as shown in Fig. 5 is generally rectangular in shape tapering at the upper end. It is provided with four alignment openings 48 and a throat or passageway 49 into which the molten metal is poured leading to the cavity. The front half of the mold is similarly constructed but is provided with pins 50, shown in dotted line in Fig. 6, which enters the openings 48 to properly align the mold. The outer surface of the front portion of the mold has a laterally extending wooden handle 51. The two halves of the mold are held together and placed on the hinged portion 23 at the back of the tray 13. It is not necessary to supply any manual pressure for the mold will be held away from the plate 10 by the rails 20 so that there will be no heat reduction of the mold. The operator steps on the pedal switch 37 and the piston 31 moves upwardly causing turning of the rod 26, this swings the U-shaped pressure member 28 upwardly to push the pressure strips 24 against the mold as shown in Figs. 3 and 4. The fluid pressure thus serves to tightly hold both halves of the mold in position shown in Fig. 4. The operator now pours molten metal into the throat 49 of the mold. The foot pressure is released and the reversing switch 37 causes the piston 49 to move in the opposite direction releasing the mold. The operator then twists the handle 51, retaining slight pressure on the mold into the dotted line portion shown in Fig. 3 along the rails 21 so that the excess metal in the throat 49 will pour into the tank 16. As this metal hits water in the tank 16 it cools and solidifies and drops to the bottom of the tank from where it can easily be removed when desired. The mold is then turned upwardly again into the original position and the operator turns the handle of the valve 41 permitting the desired quantity of cooling liquid to hit both back and front portion of the mold. The excess liquid will run into the tray 13 through the opening 15 and into the tank 16. The mold can then be opened and the finished piece removed.

The flow of cooling water and air through the branches 43 and 45 can be so regulated and controlled so that the exact correct amount of water and air will reach the desired portions of the mold with a flip of the handle of the valve 41. The above operation eliminates the danger of burns, eliminates the waste of material and eliminate fatigue caused by excessive lifting of the molds. Since the fluid pressure is constant there is less spoilage due to leaking within the mold for lack of pressure. I have found that the apparatus of the present invention will permit three to four times as much production as with the old method in addition to other advantages outlined.

The device of the present invention is simple in construction and easy and economical to manufacture and assemble. While I have described a specific embodiment of the invention it is obvious that changes may readily be made without departing from the spirit and scope of the invention. Other objects and advantages of the present invention will be readily apparent to a person skilled in the art.

I claim:

1. A molding apparatus comprising a support having a generally vertical wall and a generally horizontal wall for a mold, a mold separate from said support and freely resting on said horizontal wall and against said vertical wall and comprising a pair of mold parts, a pressure member, means for pivotally mounting said member with relation to said horizontal wall, and means to swing said member for squeezing said pair of mold parts against said wall during the mold pouring operation.

2. A molding apparatus comprising a support having a generally vertical wall and a generally horizontal wall for a mold, a mold separate from said support and freely resting on said horizontal wall and against said vertical wall and comprising a pair of mold parts, a pressure member, means for pivotally mounting said member with relation to said horizontal wall, and fluid pressure operated means to swing said member for squeezing a pair of mold parts against said wall.

3. A molding apparatus comprising a support having a horizontal and a vertical wall, a mold separate from said support and freely resting on said horizontal wall and against said vertical wall and comprising a pair of mold parts, a U-shaped member pivotally supported on said horizontal wall and fluid pressure means for pivoting said member toward said vertical wall to squeeze the parts of a mold therebetween.

4. A molding apparatus comprising a support having a horizontal and a vertical wall, a mold separate from said support and freely resting on said horizontal wall and against said vertical wall and movable in any direction relative to either and comprising a pair of mold parts, a shaft, a U-shaped member secured to said shaft and pivotally supported thereby on said horizontal wall, fluid pressure means for turning said shaft and pivoting said member toward said vertical wall to squeeze the parts of a mold therebetween, and means for controlling said fluid pressure by a foot pedal.

5. A molding apparatus as in claim 1 wherein a water tank is adjacent the squeezing position of said mold to receive the liquid poured into the mold by rocking the same prior to the setting of the cast in the neck of the mold.

6. A molding apparatus as in claim 1 wherein a water tank is adjacent the squeezing position of said mold to receive the liquid poured into the mold by rocking the same prior to the setting of the cast in the neck of the mold and a handle on the mold part distant from the vertical wall for manually rocking the mold in a plane generally parallel to said vertical wall.

References Cited in the file of this patent

UNITED STATES PATENTS

| Number | Name | Date |
|---|---|---|
| 398,588 | Downs | Feb. 26, 1889 |
| 492,874 | Reusch et al. | Mar. 7, 1893 |
| 1,593,294 | Dostal | July 20, 1926 |
| 1,611,697 | Toomey | Dec. 21, 1926 |
| 2,429,145 | Wessel | Oct. 14, 1947 |
| 2,526,918 | Wilberschied | Oct. 24, 1950 |